2,867,631
Patented Jan. 6, 1959

2,867,631

6-METHYLATED AND 11-OXYGENATED-17α-HYDROXY-21-FLUORO 4-PREGNENE 3,20 DIONES

Frank H. Lincoln, Jr., Kalamazoo, and William P. Schneider and George B. Spero, Kalamazoo Township, Kalamazoo County, Mich., assignors to The Upjohn Company, Kalamazoo, Mich., a corporation of Michigan No Drawing. Application November 23, 1956
Serial No. 623,763

5 Claims. (Cl. 260—397.45)

The present invention relates to steroid compounds and is concerned with 6-hydrocarbyl substituted steroid compounds, particularly with 6-methyl-11β,17α-dihydroxy-21-fluoro-4-pregnene-3,20-dione, the intermediate 6-methyl-11β,17α - dihydroxy - 21 - iodo - 4 - pregnene - 3,20 - dione, 6 - methyl - 17α - hydroxy - 21 - fluoro - 4 - pregnene-3,11,20-trione and a process for the production therefor.

The new compounds and the process of the present invention are illustratively represented by the following formulae:

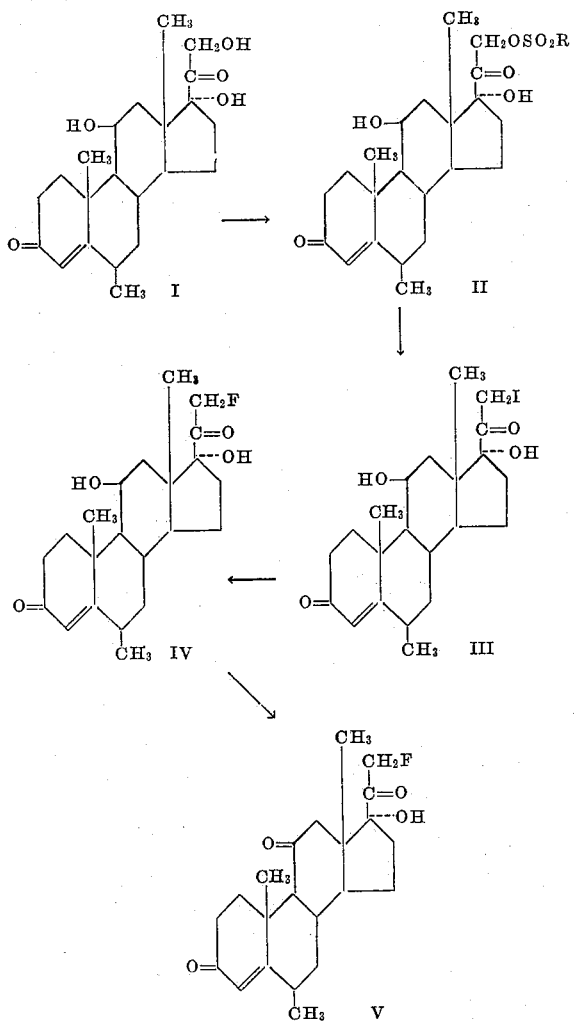

wherein R is an organic radical such as methyl, ethyl, phenyl, tolyl, naphthyl, or the like, with methyl preferred.

The process of the present invention comprises treating 6-methyl-11β,17α,21-trihydroxy-4-pregnene-3,20-dione (6-methylhydrocortisone, I) with an organic sulfonyl halide such as methanesulfonyl chloride, toluenesulfonyl chloride, toluenesulfonyl bromide, benzenesulfonyl chloride, naphthylsulfonyl chloride, or the like, to obtain the corresponding ester (II), a 21-sulfonate of 6-methyl-11β,17α,21-trihydroxy-4-pregnene-3,20-dione; treating the thus produced 21-alkyl or aryl sulfonate of 6-methyl-11β,17α,21 - trihydroxy - 4 - pregnene - 3,20 - dione with sodium iodide in acetone solution to obtain 6-methyl-11β,17α-dihydroxy-21-iodo-4-pregnene-3,20-dione (III); treating the thus obtained 6-methyl-11β,17α-dihydroxy-21-iodo-4-pregnene-3,20-dione with silver fluoride, preferably in acetonitrile solution to obtain 6-methyl-11β,17α - dihydroxy - 21 - fluoro - 4 - pregnene - 3,20 - dione (IV), and if desired oxidizing the thus obtained 6-methyl-11β,17α-dihydroxy-21-fluoro-4-pregnene-3,20-dione with chromic anhydride, N-bromoacetamide, N-bromosuccinimide, or the like, to give 6-methyl-17α-hydroxy-21-fluoro-4-pregnene-3,11,20-trione (V).

It is an object of the instant invention to provide 6 - methyl - 11β,17α - dihydroxy - 21 - fluoro - 4 - pregnene-3,20-dione and 6-methyl-17α-hydroxy-21-fluoro-4-pregnene-3,11,20-trione and in particular, the 6α-epimers, 6α - methyl - 11β,17α - dihydroxy - 21 - fluoro - 4 - pregnene-3,20-dione and 6α-methyl-17α-hydroxy-21-fluoro-4-pregnene-3,11,20-trione. It is another object of the instant invention to provide a process for the preparation of 6-methyl-11β,17α-dihydroxy-21-fluoro-4-pregnene-3,20-dione, the intermediate 6-methyl-11β,17α-dihydroxy-21 - iodo - 4 - pregnene - 3,20 - dione, and 6 - methyl-17α - hydroxy - 21 - fluoro - 4 - pregnene - 3,11,20 - trione. Other objects of this invention will be apparent to those skilled in the art to which this invention pertains.

The novel 6α-methyl-11β,17α-dihydroxy-21-fluoro-4-pregnene-3,20-diones and the 6α-methyl-17α-hydroxy-21-fluoro-4-pregnene-3,11,20-triones possess a high order of physiological activities, and possess activity spectra different from the adrenocortical hormones found in nature such as hydrocortisone and cortisone especially in their effect on mineral and water-metabolism. These compounds cause a loss of salt and water which makes them especially valuable in the management of chronic congestive heart failure and in the treatment of cirrhosis of the liver, the nephrotic syndrome and the treatment of eclampsia and preeclampsia. The novel synthetic corticosteroid hormones of the present invention also possess anti-inflammatory, glucocorticoid, anesthetic, uterine, ovarial and adrenal growth-depressional, and adrenal corticoid activity. The anti-inflammatory activity is notable in all the streoids of the present invention. The 6β-epimers, 6β-methyl-11β,17α-dihydroxy-21-fluoro-4-pregnene-3,20-dione and 6β-methyl-17α-hydroxy-21-fluoro-4-pregnene-3,11,20-triones have the same activity as the 6α-epimers.

The novel 6-methyl-11β,17α-dihydroxy-21-fluoro-4-pregnene - 3,20 - diones and 6 - methyl - 17α - hydroxy-21-fluoro-4-pregnene-3,11,20-triones are useful in oral, parenteral and topical compositions. In oral compositions the material may be given as tablets illustratively using either polyethylene glycol 4000 or 6000 as a carrier or lactose and/or sucrose as a diluent. The novel 6α - methyl - 11β,17α - dihydroxy - 21 - fluoro - 4 - pregnene-3,20-dione and 6α-methyl-17α-hydroxy-21-fluoro-4-pregnene-3,11,20-trione are also useful for topical application as ointments, lotions, jellies, creams, suppositories, bougies, aqueous suspensions etc. Examples of especially advantageous topical preparations of suitable compositions are given below. While the examples are illustrative for the 6α-methyl-11β,17α-dihydroxy-21-fluoro-4-pregnene - 3,20 - dione and 6α - methyl - 17α - hydroxy-21-fluoro-4-pregnene-3,11,20-trione, equivalent amounts of 6β - methyl - 11β,17α - dihydroxy - 21 - fluoro - 4- pregnene - 3,20 - diones and 6β - methyl - 17α - hydroxy-21-fluoro-4-pregnene-3,11,20-trione and of other 6-loweralkyl and 6-phenyl homologues of the compound of this invention are substitutable therein.

A suitable dermatological and ophthalmic ointment has the following composition:

| | Lbs. |
|---|---|
| Wool fat USP | 100 |
| Mineral oil USP | 125 |
| 6α - methyl - 11β,17α - dihydroxy - 21 - fluoro-4-pregnene-3,20-dione (micronized) | 10 |
| White petrolatum USP | 500 |

Incorporation of an antibiotic in the ointment, especially neomycin sulfate, has therapeutic advantages, each active ingredient potentiating and supplementing the useful properties of the other. Such an ointment is as follows:

| | Lbs. |
|---|---|
| Wool fat USP | 100 |
| Mineral oil USP | 125 |
| Neomycin sulfate | 3 |
| 6α - methyl - 11β,17α - dihydroxy - 21 - fluoro - 4-pregnene-3,20-dione (micronized) | 5 |
| White petrolatum USP | 500 |

In place of, or in addition to, neomycin sulfate, other antibiotics such as bacitracin, circulin, polymyxin B sulfate, gramicidin, streptomycin sulfate, dihydrostreptomycin sulfate, oxytetracycline, chlorotetracycline, tetracycline, chloramphenicol and the sulfonamides can be used in conjunction with the steroids of the present invention in preparations such as the above ointments.

The compounds of the instant invention, 6-methyl-11β,17α - dihydroxy-21-fluoro-4-pregnene-3,20-dione and the 11-keto analogues thereof are also useful as starting materials for the preparation of other physiologically important compounds, such as the 9α-halo analogues, especially 6α-methyl-9α,21-difluoro-11β,17α-dihydroxy-4-pregnene-3,20-dione and 6α-methyl-9α,21-difluoro-17α-hydroxy-4-pregnene-3,11,20-trione which can be prepared as shown in Examples 11 and 12. The halo derivatives, 6α - methyl-9α,21-difluoro-11β,17α-dihydroxy-4-pregnene-3,20-dione and 6α-methyl-9α,21-difluoro-17α-hydroxy-4-pregnene-3,11,20-trione are compounds having glucocorticoid and anti-inflammatory activity and may be used instead or with 6α-methyl-11β,17α-dihydroxy-4-pregnene-3,20-dione and 6α-methyl-17α-hydroxy-4-pregnene-3,11,20-trione in the above pharmaceutical compositions.

The starting compounds of the instant invention are 6-methylhydrocortisone (6α and 6β-isomers) or other 6-alkylhydrocortisones prepared as shown in Preparations 1 through 9.

In carrying out the process of the instant invention, 6-methylhydrocortisone (6α- or 6β-methylhydrocortisone) is treated with an acid halide of a sulfonic acid such as methanesulfonic acid, ethanesulfonic acid, propanesulfonic acid, benzenesulfonic acid, β-toluenesulfonic acid, α- and β-naphthanesulfonic acid, or the like, with methanesulfonic acid halides, especially methanesulfonyl chloride, preferred. In the preferred embodiment of the instant invention, the steroid is usually reacted with the alkyl- or arylsulfonyl halide in solution in a solvent such as pyridine, benzene, toluene, or the like at a temperature between minus ten and plus sixty degrees centigrade providing that at the lower temperature the reaction mixture has not solidified. Thus for pyridine, dioxane, toluene, or the like, temperatures around zero to ten degrees may be used, while for benzene only temperatures above five degrees are suitable on account of its relatively high melting point. The time of reaction is usually between thirty minutes and six or eight hours after which the product, 6-methyl-11β,17α,21-trihydroxy-4-pregnene-3,20-dione 21-alkyl- or arylsulfonate is removed in conventional manner, for example, by evaporating the solvent until a dry residue is precipitated or by extracting the material from an aqueous solution. For extraction, solvents such as methylene dichloride, chloroform, carbon tetrachloride, benzene, ether, toluene, or the like may be used. Removing the extraction solvent by distillation leaves the 6-methyl-11β,17α,21-trihydroxy-4-pregnene-3,20-dione 21-alkyl- or arylsulfonate.

From the thus-obtained 6 - methyl - 11β,17α,21 - trihydroxy-4-pregnene-3,20-dione 21-alkyl- or arylsulfonate without further purification 6-methyl-11β,17α-dihydroxy-21-iodo-4-pregnene-3,20-dione is prepared by reacting the alkyl- or arylsulfonate of 11β,17α,21-trihydroxy-4-pregnene-3,20-dione, dissolved in acetone, with sodium or potassium iodide at reflux temperature. Excess of sodium iodide is generally preferred and the reaction mixture is refluxed for a period of three or four minutes to half an hour. The thus produced 6-methyl-11β,17α-dihydroxy-21-iodo-4-pregnene-3,20-dione is obtained from the reaction mixture by evaporating the solvent and can be used without further purification for the preparation of 6-methyl-11β,17α-dihydroxy-21-fluoro-4-pregnene-3,20-dione.

The 21-iodo compound, 6-methyl-11β,17α-dihydroxy-21-iodo-4-pregnene-3,20-dione, dissolved in a suitable solvent such as acetonitrile, hexanes, heptanes, benzene, tertiary butyl alcohol, or the like with acetonitrile preferred, is then reacted with silver fluoride. The reaction is usually carried out under exclusion of light and with stirring. The preferred form of silver fluoride used is a fifty percent aqueous silver fluoride solution rather than solid silver fluoride. The reaction is preferably carried out between forty to sixty degrees centigrade, however, lower or higher temperatures between ten and about 75 degrees centigrade are operative. Since the silver iodide produced in the reaction forms a molecular compound with silver fluoride, two moles of silver fluoride must be used per mole of steroid as the minimum amount necessary for theoretical recovery. However, it is preferred to use an even greater amount, between ten to fifty percent over and above the calculated amount, in order to obtain higher yields. The silver fluoride is usually added in portions over a period of time. The reaction time ranges from one half to six hours. In order to isolate the product, 6 - methyl - 11β,17α - dihydroxy - 21 - fluoro-4-pregnene-3,20-dione, the solvent is evaporated and the crude product extracted with a suitable solvent such as chloroform, methylene chloride, carbon tetrachloride, benzene, or the like. Purification is made by conventional procedures such as additional extraction to eliminate impurities, recrystallization, or chromatography, as deemed necessary.

The oxidation of 6-methyl-11β,17α-dihydroxy-21-fluoro-4-pregnene-3,20-dione is generally carried out in conventional manner such as, for example, oxidizing the 6-methyl - 11β,17α - dihydroxy - 21 - fluoro - 4 - pregnene-3,20-dione in acetic acid solution with chromic anhydride using a calculated amount of chromic anhydride or a slight excess such as from ten to thirty percent excess of the calculated amount, or oxidizing the 11β,17α-dihydroxy-21-fluoro-4-pregnene-3,20-dione with a N-halo amide or N-haloimide of an acid such as, N-bromoacetamide, N-chlorosuccinimide, N-bromosuccinimide, or the like, in pyridine, dioxane, or other solvent solutions. After termination of the oxidation the oxidant is generally destroyed such as by addition of methyl alcohol, ethyl alcohol, and other alcohols when chromic anhydride was used or bisulfite for both chromic anhydride and N-haloacidamides and N-haloacidimides. Thereafter, the product 6-methyl-17α-hydroxy-21-fluoro-4-pregnene-3,11,20-trione is isolated by conventional means such as extraction with water-immiscible solvents, for example, methylene chloride, ethylene chloride, chloroform, carbon tetrachloride, ether, benzene, toluene, or the like, or by chromatography, if deemed necessary.

The following examples are illustrative of the process

PREPARATION 1

*5α,6α-oxido-11β,17α,21-trihydroxyallopregnane-3,20-dione 3,20-bis-(ethylene ketal)*

To a solution of 0.901 gram of 11β,17α,21-trihydroxy-4-pregnene-3,20-dione 3,20-bis-(ethylene ketal) in eighteen milliliters of chloroform was added a solution of 331 milligrams of perbenzoic acid in 5.19 milliliters of chloroform. The resulting solution was allowed to stand in the refrigerator (ca. four degrees centigrade) for a period of 24 hours and thereupon at room temperature for an additional period of 72 hours. The reaction solution was then washed with five percent sodium bicarbonate solution and water, dried over anhydrous sodium sulfate and evaporated to dryness to give 1.031 grams of crude solid. Recrystallization from acetone gave 431 milligrams of material of melting point 230 to 247 degrees centigrade. The mother liquor, after evaporation to dryness, was dissolved in methylene chloride and chromatographed over 25 grams of acid washed alumina. The column was developed with three fractions each of methylene chloride plus five, ten, fifteen, twenty, twenty-five and fifty percent acetone, acetone, and acetone plus five percent methanol. The acetone plus five percent methanol eluate gave an additional 279 milligrams of the high melting product. The high melting material, 5α,6α-oxido-11β,17α,21-trihydroxy-allopregnane-3,20-dione 3,20-bis-(ethylene ketal) was three times recrystallized from acetone and methanol to give a pure product of melting point 263 to 268 degrees centigrade. Other eluate fractions of lower melting point contained the 5β,6β-isomer thereof.

PREPARATION 2

*5α,6α-oxido-17α,21-dihydroxypregnane-3,11,20-trione 3,20-bis-(1,2-propylene ketal)*

To a solution of one gram of 17α,21-dihydroxy-5-pregnene-3,11,20-trione 3,20-bis-(1,2-propylene ketal) [cortisone 3,20-bis-(1,2-propylene ketal)] in chloroform was added a solution of perbenzoic acid in chloroform and the resulting solution allowed to stand in a refrigerator and then at room temperature, following the procedure of Preparation 1. The reaction solution was washed, dried, and evaporated as in Preparation 1. Recrystallization from acetone followed by fractionation of the mother liquor on a column of acid washed alumina, using the technique of Preparation 1, yielded 5α,6α-oxido-17α,21-dihydroxyallopregnane-3,11,20-trione 3,20-bis-(1,2-propylene ketal) and the 5β,6β-oxido isomer.

Using as starting material in Preparation 2, the more commonly available cortisone 3,20-bis-(ethylene ketal) gives the 5α,6α-oxido-17α,21-dihydroxyallopregnane-3,11,20-trione 3,20-bis-(ethylene ketal).

In the same manner as shown in Preparations 1 and 2, 5α,6α-oxido-11β,17α,21-trihydroxyallopregnane-3,20-dione 3,20-bis-(alkylene ketals) and 5α,6α-oxido-17α,21-dihydroxyallopregnane-3,11,20-trione 3,20-bis-(alkylene ketals) can be prepared by reacting cortisone or hydrocortisone diketals wherein the ketal group has been formed by reacting the steroid 3,20-dione with glycols, such as ethylene, propylene, 1,2- 1,3-, or 2,3-butylene glycol or pentane, hexane, heptane, or octane-diols wherein the alcohol groups are in vicinal positions such as 1,2, 2,3, 3,4 or the like, or separated by one carbon atom such as 1,3, 2,4, 3,5, and the like, with an organic peracid such as performic, peracetic, perbenzoic, monoperphthalic acid, or the like. For the purpose of this invention, starting compounds having the ethylene ketal groups are preferred, since these ketals are generally more easily prepared in high yield than ketals produced by the reaction of the 3,20-diketo compounds with higher alkanediols.

PREPARATION 3

*5α,11β,17α,21-tetrahydroxy-6β-methylallopregnane-3,20-dione 3,20-bis-(ethylene ketal)*

A solution of 1.115 grams of 5α,6α-oxido-11β,17α,21-trihydroxyallopregnane-3,20-dione 3,20-bis-(ethylene ketal) in 165 milliliters of tetrahydrofuran (the tetrahydrofuran being dried through distillation over lithium aluminum hydride) was added dropwise to a solution of 95 milliliters of methyl magnesium bromide in ether (the magnesium bromide having a four molar concentration). To this mixture was added 575 milliliters of benzene and the reaction mixture was thereupon allowed to stir and reflux for 26 hours. After cooling, the reaction mixture was poured into 700 milliliters of iced, saturated ammonium chloride solution, stirred for a period of thirty minutes, and the benzene layer separated from the aqueous layer. The aqueous phase was extracted with three 200-milliliter portions of ethyl acetate and the extracts added to the benzene layer. The combined benzene-ethyl acetate solution was thereupon washed with water, dried over anhydrous sodium sulfate and evaporated to dryness to give 1.314 grams of crude solid. Trituration of this material with ether left 1.064 grams of crystalline product of melting point 221 to 230 degrees. Recrystallization of this material gave 5α,11β,17α,21-tetrahydroxy-6β-methylallopregnane-3,20-dione 3,20-bis-(ethylene ketal) of melting point 228 to 233 degrees and rotation $[\alpha]_D$ minus eleven degrees in chloroform.

*Analysis.*—Calcd. for $C_{26}H_{42}O_8$: C, 64.70; H, 8.77. Found: C, 64.29; H, 8.69.

PREPARATION 4

*5α,11β,17α,21-tetrahydroxy-6β-ethylallopregnane-3,20-dione 3,20-bis-(ethylene ketal)*

In the same manner as shown in Preparation 3, 5α,6α-oxido-11β,17α,21-trihydroxyallopregnane-3,20-dione 3,20-bis-(ethylene ketal), was reacted with ethyl magnesium bromide in ether solution to give the corresponding 5α,11β,17α,21-tetrahydroxy-6β-ethylallopregnane-3,20-dione 3,20-bis-(ethylene ketal).

In the same manner as shown in Preparations 3 and 4, other 5α,11β,17α,21-tetrahydroxy-6β-alkylallopregnane-3,20-dione 3,20-bis-(ethylene ketals) and 5α,17α,21-trihydroxy-6β-alkylallopregnane-3,11,20-trione 3,20-bis-(ethylene ketals) are prepared by reacting the corresponding 5α,6α-oxido-17α,21-dihydroxyallopregnane-3,20-dione 3,20-bis-(ethylene ketal) oxygenated in the 11-position with a metal alkyl or metal aryl more specifically an alkyl metal halide such as a Grignard reagent, for example, methyl, ethyl, propyl, isopropyl, butyl, pentyl, hexyl, and phenyl magnesium bromides and iodides or cadmium alkyl and calcium alkyl and phenyl bromides or iodides. Representative 6β-alkylated allopregnanes thus prepared include: 5α,11β,17α,21-tetrahydroxy-6β-propylallopregnane-3,20-dione 3,20-bis-(ethylene ketal), 5α,11β,17α,21-tetrahydroxy-6β-butylallopregnane-3,20-dione 3,20-bis-(ethylene ketal), 5α,11β,17α,21-tetrahydroxy-6β-isobutylallopregnane-3,20-dione 3,20-bis-(ethylene ketal), 5α,11β,17α,21-tetrahydroxy-6β-pentylallopregnane-3,20-dione 3,20-bis-(ethylene ketal), 5α,11β,17α,21-tetrahydroxy-6β-hexylallopregnane-3,20-dione 3,20-bis-(ethylene ketal), 5α,11β,17α,21-tetrahydroxy-6β-phenylallopregnane-3,20-dione 3,20-bis-(ethylene ketal), 5α,17α,21-trihydroxy-6β-methylallopregnane-3,11,20-trione 3,20-bis-(ethylene ketal), 5α,17α,21-trihydroxy-6β-ethylallopregnane-3,11,20-trione 3,20-bis-(ethylene ketal), 5α,17α,21-trihydroxy-6β-propylallopregnane-3,11,20-trione 3,20-bis-(ethylene ketal), 5α,17α,21-trihydroxy-6β-isopropylallopregnane-3,11,20-trione 3,20-bis-(ethylene ketal), 5α,17α,21-trihydroxy-6β-butylallopregnane-3,11,20-trione 3,20-bis-(ethylene ketal), 5α,17α,21-trihydroxy-6β-pentylallopregnane-3,11,20-trione 3,20-bis-(ethylene ketal), 5α,17α,21-trihydroxy-6β-hexylallopregnane-3,11,20-trione 3,20-bis-(ethylene ketal), 5α,17α,21-trihydroxy-6β-phenylallopregnane-3,11,20-trione 3,20-bis-(ethylene ketal), and the like.

PREPARATION 5

5α,11β,17α,21 - tetrahydroxy - 6β - methylallopregnane-3,20-dione

A solution was prepared containing 468 milligrams of 5α,11β,17α,21-tetrahydroxy - 6β - methylallopregnane-3,20-dione 3,20-bis-(ethylene ketal), 38 milliliters of methanol and 7.7 milliliters of 2N sulfuric acid. This solution was refluxed for a period of thirty minutes, then neutralized with five percent dilute sodium biscarbonate solution (about 100 milliliters) and concentrated under reduced pressure at 55 degrees centigrade to about 35 milliliters of volume. A product crystallized upon cooling and was recovered by filtration. This product was recrystallized from acetone Skellysolve B hexanes to give an analytical pure sample of 5α,11β,17α,21-tetrahydroxy-6β-methylallopregnane-3,20-dione of melting point 240 to 244 (decomposition) and rotation $[α]_D$ plus forty degrees in dioxane.

Analysis.—Calcd. for $C_{22}H_{34}O_6$: C, 66.98; H, 8.69. Found: C, 66.84; H, 8.86.

PREPARATION 6

5α,11β,17α,21 - tetrahydroxy - 6β - ethylallopregnane-3,20-dione

In the same manner as shown in Example 5, 5α,11β,17α,21-tetrahydroxy-6β-ethylallopregnane-3,20-dione 3,20-bis-(ethylene ketal) was hydrolyzed with dilute sulfuric acid in ethanol solution to give 5α,11β,17α,21-tetrahydroxy-6β-ethylallopregnane-3,20-dione.

In the same manner as shown in Preparations 5 and 6, inclusive, hydrolysis of the 6β-alkylallopregnane diketals, such as the 5α,11β,17α,21-tetrahydroxy-6β-alkylallopregnane-3,20-dione 3,20-bis-(ethylene ketal), and 5α,17α,21-trihydroxy-6β-alkylallopregnane-3,11,20-trione 3,20-bis-(ethylene ketal) as well as those 6β-alkylallopregnane-3,20-dione 3,20-bis-(ketals) wherein the ketal group is other than ethylene can be hydrolyzed to give the corresponding 5α,17α,21-trihydroxy-6β-alkylallopregnane-3,20-diones oxygenated in the 11-position, such as for example, 5α,11β,17α,21-tetrahydroxy - 6β - propylallopregnane-3,20-dione, 5α,11β,17α,21-tetrahydroxy-6β-butylallopregnane-3,20-dione, 5α,11β,17α,21-tetrahydroxy-6β-isobutylallopregnane - 3,20 - dione, 5α,11β,17α,21-tetrahydroxy-6β-pentylallopregnane-3,20-dione, 5α,11β,17α,21-tetrahydroxy-6β-hexylallopregnane - 3,20 - dione, 5α,11β,17α,21-tetrahydroxy-6β-phenylallopregnane - 3,20 - dione, 5α,17α,21-trihydroxy-6β-methylallopregnane - 3,11,20-trione, 5α,17α,21-trihydroxy-6β-ethylallopregnane-3,11,20-trione, 5α,17α,21-trihydroxy-6β-propylallopregnane-3,11,20-trione, 5α,17α,21-trihydroxy-6β-isopropylallopregnane-3,11,20-trione, 5α,17α,21-trihydroxy - 6β - butylallopregnane-3,11,20-trione, 5α,17α,21-trihydroxy - 6β - hexylallopregnane - 3,11,20 - trione, 5α,17α,21 - trihydroxy-6β-pentylallopregnane-3,11,20-trione, 5α,17α,21-trihydroxy-6β-phenylallopregnane-3,11,20-trione, and the like, and including those 6β-alkylallopregnanes having ketal groups in positions 3 and 20 such as exemplified in Preparation 2.

PREPARATION 7

6α-methylhydrocortisone

A stream of nitrogen was bubbled through a solution of 429 milligrams of 5α,11β,17α,21-tetrahydroxy-6β-methylallopregnane-3,20-dione, contained in 100 milliliters of denatured absolute alcohol, for a period of ten minutes. To this solution was added 4.3 milliliters of 0.1 normal sodium hydroxide solution which had likewise been treated with nitrogen. The mixture was allowed to stand in a nitrogen atmosphere for a period of eighteen hours and thereupon acidified with acetic acid, and concentrated under reduced pressure at 55 degrees centigrade to dryness. The residue weighing 417 milligrams was recrystallized from acetone-Skellysolve B hexanes to give in two crops 249 milligrams of 6-methylhydrocortisone melting between 184 and 194 degrees centigrade. An analytical sample was prepared melting at 203 to 208 degrees centigrade and consisting of pure 6α-methylhydrocortisone.

Analysis.—Calcd. for $C_{22}H_{32}O_5$: C, 70.18; H, 8.57. Found: C, 70.32; H, 8.50.

The mother liquors contained besides 6α-methylhydrocortisone, substantial amounts of 6β-methylhydrocortisone which can be isolated by recrystallization, papergram, countercurrent procedures and other means known in the art.

PREPARATION 8

6β-methylhydrocortisone

A solution was prepared containing 27.5 grams of 5α,11β,17α,21 - tetrahydroxy - 6β - methylallopregnane - 3,20-dione in 6500 milliliters of ethanol denatured with methanol. The solution was freed of air oxygen by bubbling oxygen-free nitrogen through it for a period of fifteen minutes. To this solution was added a similarly air oxygen-free prepared solution of one-tenth normal sodium hydroxide (235 milliliters). The solution was allowed to stand at room temperature (about 22 to 24 degrees centigrade) in an inert nitrogen atmosphere for a period of twenty hours and was then acidified with fourteen milliliters of acetic acid. The thus obtained acid solution was evaporated at about fifty to sixty degrees centigrade in vacuo, the thus produced residue dissolved in 200 milliliters of ethyl acetate and 200 milliliters of water, the water layer separated from the organic layer and discarded, the organic layer washed with 350 milliliters of five percent aqueous sodium bicarbonate solution, then three times with water and thereupon dried over anhydrous sodium sulfate and concentrated to a volume of 180 milliliters. After cooling the 180 milliliters of solution in a refrigerator (about five degrees centigrade), the solution was filtered giving 11.9 grams of material. This material was redissolved in 500 milliliters of ethyl acetate, the ethyl acetate solution was concentrated to 150 milliliters, refrigerated as before to give 6.15 grams of crude 6β-methylhydrocortisone of melting point 220–223.

Recrystallization of the crude 6β-methylhydrocortisone three more times from ethyl acetate gave an analytical sample of 6β-methylhydrocortisone with melting point 223 to 227 degrees centigrade, rotation $[α]_D$ plus 105 degrees in acetone; ultraviolet absorption $$\lambda_{max.}^{95\% \text{ ethanol}} \ 243 \ m\mu$$

$a_M = 14,500$.

Analysis.—Calcd. for $C_{22}H_{32}O_5$: C, 70.17; H, 8.57. Found: C, 70.54; H, 8.91.

PREPARATION 9

6α-ethylhydrocortisone

In the same manner as shown in Preparation 7, 5α,11β,17α,21 - tetrahydroxy - 6β - ethylallopregnene - 3,20-dione was treated with a solution of potassium hydroxide in methanol to give at room temperature, 6α-ethylhydrocortisone of melting point 223–226 degrees centigrade and $$\lambda_{max.}^{EtOH} \ 243$$

$ε14,525$.

In the same manner dehydrating with an alkali metal hydroxide in alcoholic solution other 11-oxygenated-5α,17α,21 - trihydroxy - 6β-alkylallopregnane-3,20-diones produced the corresponding 11-oxygenated 6α-alkyl-17α,21-dihydroxy-4-pregnene-3,20-diones such as 6α-propylhydrocortisone, 6α-butylhydrocortisone, 6α-isobutylhydrocortisone, 6α-pentylhydrocortisone, 6α - hexylyhydrocortisone, or aryl analogues, such as 6α-phenylhydrocortisone, 6α-methylcortisone of melting point 212.5 to 215 degrees centigrade, 6α-ethylcortisone, 6α-propylcortisone, 6α-isopropylcortisone, 6α-butylcortisone, 6α-pentylcortisone, 6α-hexylcortisone, 6α-phenylcortisone, and the like.

EXAMPLE 1

*6α - methyl - 11β,17α,21-trihydroxy-4-pregnene-3,20-dione 21 - methanesulfonate (6α - methylhydrocortisone 21 - methanesulfonate)*

A solution was prepared containing one gram (2.65 millimoles) of 6α-methylhydrocortisone in seven milliliters of pyridine. This solution was cooled to zero degrees centigrade and treated with 0.3 milliliter of methanesulfonyl chloride. Thereafter the solution was allowed to stand at zero to five degrees centigrade for a period of two hours, after which it was diluted with water and extracted with three 25-milliliter portions of methylene chloride. The extracts were combined, washed with cold dilute hydrochloric acid until a pH of two to three was maintained in the aqueous layer, then washed again with cold sodium bicarbonate solution, water and finally dried over anhydrous sodium sulfate. Evaporation of the methylene chloride extract at reduced pressure gave a white glassy product of 6α-methyl-11β,17α,21-trihydroxy-4-pregnene-3,20-dione 21-methanesulfonate.

EXAMPLE 2

*6α-methyl-11β-17α-dihydroxy-21-iodo-4-pregnene-3,20-dione*

The crude 6α-methyl-11β,17α,21-trihydroxy-4-pregnene-3,20-dione 21-methanesulfonate of Example 1 was dissolved in fifteen milliliters of acetone and treated with a solution of one gram of sodium iodide in ten milliliters of acetone. The mixture was heated under reflux with stirring for a period of fifteen minutes, the heat then reduced and the mixture concentrated to one third volume at reduced pressure. Ice and water were added and the precipitated product collected on a filter, washed with water and dried to yield 1.1 gram of 6α-methyl-11β,17α - dihydroxy - 21 - iodo - 4 - pregnene - 3,20 - dione of melting point 135 to 140 degrees centigrade with decomposition.

Analysis.—Calcd. for $C_{22}H_{31}O_4I$: I, 26.09. Found: I, 25.05.

EXAMPLE 3

*6α-methyl-11β,17α-dihydroxy-21-fluoro-4-pregnene-3,20-dione*

A solution of one gram of 6α-methyl-11β,17α-dihydroxy-21-iodo-4-pregnene-3,20-dione in 150 milliliters of acetonitrile (practical grade) was prepared by heating to the boiling point. After cooling to forty degrees centigrade, the solution was protected from light and 0.8 milliliter of fifty percent aqueous solution of silver fluoride was added under stirring. Stirring was continued for one hour at about forty degrees centigrade, then 0.7 milliliter of silver fluoride solution was added and after another hour of stirring another 0.7 milliliter portion of aqueous silver fluoride solution was added. Heating and stirring was then continued for a period of two hours. The brown mixture was thereupon filtered through a bed of Celite diatomaceous earth and the filtrate evaporated at reduced pressure from a bath at a temperature of fifty degrees centigrade. The brown residue was thoroughly extracted with two one-hundred-milliliter portions of warm methylene chloride, the combined extracts washed with water, dried over anhydrous sodium sulfate and concentrated to approximately 100-milliliter volumes and chromatographed over 50 grams of Florisil synthetic magnesium silicate. Fractions of 200 milliliters were taken as follows:

TABLE I

| Fractions: | Solvent |
|---|---|
| 1–9 | Hexane-acetone 90:10 |
| 10–12 | Hexane-acetone 85:15 |
| 13 | Acetone 100 percent |

The hexane mixture used was Skellysolve B hexanes. Fractions 5 to 8, inclusive, were combined and evaporated to give 283 milligrams of crystals which after recrystallization from acetone-Skellysolve B (yielded 260 milligrams) of 6α-methyl-11β,17α-dihydroxy-21-fluoro-4-pregnene-3,20-dione of 220 to 223 degrees centigrade.

Analysis.—Calcd. for $C_{21}H_{27}O_4F$: C, 69.81; H:26; F, 5.02 Found: C, 70.14; H, 7.95; F, 5.60.

Infrared spectrum in Nujol mineral oil suspension:

| | Cm.$^{-1}$ |
|---|---|
| Hydroxy | 3440 |
| 20-keto | 1724 |
| 3-keto | 1645 |
| $\Delta^4$-double bond | 1608 |

EXAMPLE 4

*6α-methyl-17α-hydroxy-21-fluoro-4-pregnene-3,11,20-trione*

A solution was prepared containing 0.5 gram of 6α-methyl-11β,17α-dihydroxy-21 - fluoro-4-pregnene - 3,20-dione, 0.15 gram of chromic acid, ten milliliters of glacial acetic acid and one-half milliliter of water. This mixture was stirred and thereupon maintained for eight hours at room temperature. Thereafter the mixture was poured into fifty milliliters of ice water, neutralized by the addition of dilute sodium hydroxide and the thus obtained precipitate collected on a filter and recrystallized three times from ethyl acetate and Skellysolve B hexanes to give 6α-methyl-17α-hydroxy-21-fluoro-4-pregnene-3,11,20-trione.

EXAMPLE 5

*6α-ethyl-11β,17α,21-trihydroxy-4-pregnene-3,20-dione 21-toluenesulfonate*

In the same manner given in Example 1, 6α-ethylhydrocortisone, dissolved in pyridine, was treated with toluenesulfonyl chloride to give 6α-ethyl-11β,17α,21-trihydroxy-4-pregnene-3,20-dione 21-toluenesulfonate.

EXAMPLE 6

*6α-ethyl-11β,17α-dihydroxy-12-iodo-4-pregnene-3,20-dione*

In the same manner given in Example 2, reacting 6α-ethyl-11β,17α,21-trihydroxy-4-pregnene-3,20 - dione 21-toluenesulfonate with sodium iodide yielded 6α-ethyl-11β,17α-dihydroxy-21-iodo-4-pregnene-3,20-dione.

EXAMPLE 7

*6α-ethyl-11β,17α-dihydroxy-21-fluoro-4-pregnene-3,20 dione*

In the same manner given in Example 3, 6α-ethyl-11β,17α-dihydroxy-21-iodo-4-pregnene-3,20 - dione, dissolved in acetonitrile, was heated with a fifty percent aqueous silver fluoride solution, to give 6α-ethyl-11β,17α-dihydroxy-21-fluoro-4-pregnene-3,20-dione.

EXAMPLE 8

*6α-ethyl-17α-hydroxy-21-fluoro-4-pregnene-3,11,20-trione*

To 200 milligrams of 6α-ethyl-11β,17α-dihydroxy-21-fluoro-4-pregnene-3,20-dione in eight milliliters of methanol was added 0.2 milliliter of pyridine, 0.4 milliliter of water and 150 milligrams of N-bromoacetamide. The reaction mixture was kept at room temperature for a period of twenty hours and then 25 milliliters of dilute sodium sulfite solution, was added to destroy excess N-bromoacetamide. The mixture was thereupon concentrated until copious crystallization occurred. The mixture was cooled to zero degrees centigrade and kept at this temperature for a period of one hour to yield 6α-ethyl-17α-hydroxy - 21 - fluoro-4-pregnene - 3,11,20-trione.

EXAMPLE 9

*6α-methyl-17α-hydroxy-21-fluoro-4-pregnene-3,11,20-trione*

In the same manner shown in Example 1, treating 6α-methyl-17α,21-dihydroxy-4-pregnene-3,11,20-trione with methanesulfonyl chloride in pyridine solution yielded 6α-methyl-17α,21-dihydroxy-4-pregnene - 3,11,20 - trione 21-methanesulfonate; refluxing the 21-methanesulfonate of 6α-methyl-17α,21-dihydroxy-4-pregnene-3,11,20-trione with potassium iodide in acetone solution results in 6α-methyl-17α-hydroxy-21-iodo-4-pregnene-3,11,20 - trione; and treating the thus obtained 6α-methyl-17α-hydroxy-21-iodo-4-pregnene-3,11,20-trione in acetonitrile solution with aqueous silver fluoride solution produces 6α-methyl-17α-hydroxy-21-fluoro-4-pregnene-3,11,20-trione.

EXAMPLE 10

In the same manner shown in Example 1, treating other 6α-alkylhydrocortisone and 6α-alkylcortisone or the 6α-aryl analogues thereof with the chlorides or bromides of toluenesulfonic acid, methanesulfonic acid, and other organic sulfonic acids, give the corresponding 21-toluenesulfonate, the 21-methanesulfonate, or the like 21esters of the corresponding 6α-alkylhydrocortisone, 6α-alkylcortisone or 6α-aryl analogues of hydrocortisone and cortisone wherein the alkyl group may be methyl, ethyl, propyl, isopropyl, butyl, isobutyl, pentyl, hexyl, or aryl such as phenyl, or the like.

Treating the thus obtained 21-toluenesulfonate, 21-methanesulfonate or other 21-alkyl- or 21-arylsulfonates of 6α-alkylhydrocortisone and 6α-alkylcortisone or the 6α-aryl analogues thereof with sodium or potassium iodide in acetone at elevated temperature, usually reflux temperature, yields the corresponding 21-iodo compound such as, for example, 6α-propyl-11β,17α-dihydroxy-21-iodo-4-pregnene-3,20-dione, 6α-isopropyl-11β,17α - dihydroxy-21-iodo-4-pregnene-3,20-dione, 6α-butyl - 11β,17α-dihydroxy-21-iodo-4-pregnene-3,20-dione, 6α - isobutyl-11β,17α-dihydroxy-21-iodo-4-pregnene-3,20 - dione, 6α-pentyl-11β,17α - dihydroxy-21 - iodo-4-pregnene - 3,20-dione, 6α-phenyl-11β,17α-dihydroxy-21-iodo-4-pregnene-3,20-dione, 6αmethyl-17α-hydroxy-21 - iodo-4-pregnene-3,11,20-trione, 6α-ethyl-17α-hydroxy-21-iodo-4-pregnene-3,11,20-trione, 6α-propyl-17α - hydroxy - 21-iodo-4-pregnene-3,11,20-trione, 6α-isopropyl-17α-hydroxy-21-iodo-4-pregnene-3,11,20-trione, 6α-butyl-17α-hydroxy-21-iodo-4-pregnene-3,11,20-trione, 6α-isobutyl-17α-hydroxy-21-iodo-4-pregnene-3,11,20-trione, 6α-pentyl-17α - hydroxy - 21-iodo-4-pregnene-3,11,20-trione, 6α-hexyl-17α-hydroxy-21-iodo-4-pregnene-3,11,20-trione, 6α-phenyl-17α - hydroxy-21-iodo-4-pregnene-3,11,20-trione, and the like.

Treating the thus obtained 6α-alkyl-11β,17α-dihydroxy-21-iodo-4-pregnene-3,20-diones or 6α-alkyl-17α-hydroxy-21-iodo-4-pregnene-3,11,20-triones or respectively the 6α-aryl analogues thereof with aqueous fifty percent silver fluoride solution in acetonitrile as described in Example 3, produces the corresponding 6α-alkyl or 6α-aryl-11β,17α-dihydroxy-21 - fluoro-4-pregnene - 3,20-diones or, respectively, the 6α-alkyl- or 6α-aryl-17α-hydroxy - 21-fluoro-4-pregnene-3,11,20-triones wherein the alkyl group is ethyl, propyl, isopropyl, butyl, isobutyl, pentyl, hexyl, or aryl, such as phenyl, or the like.

Instead of 6α-methylhydrocortisone or cortisone, the 6β-epimer can be used in the above examples and if the reaction conditions are kept near neutral, 6β-epimers, such as 6β-methyl-11β,17α-dihydroxy-21-fluoro-4-pregnene-3,20-dione and 6β-methyl-17α-hydroxy-21-fluoro-4-pregnene-3,11,20-trione can be isolated from the reaction mixture. The thus obtained β-epimers yield the 6α-epimers by treatment with acid or base in an organic solvent, e. g., ethanol at room temperature.

EXAMPLE 11

*6α-methyl-9α,21-difluoro-11β,17α-dihydroxy-4-pregnene-3,20-dione*

A mixture of one gram of 6α-methyl-11β,17α-dihydroxy-21-fluoro-4-pregnene-3,20-dione, 650 milligrams of N-bromoacetamide and six milliliters of pyridine were stirred in the dark for a period of thirty minutes. The mixture was cooled in an ice-water bath and a stream of sulfur dioxide was directed onto the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed with water and dried under vacuum. After crystallization from acetone there was obtained about 0.8 gram of 6α-methyl-17α-hydroxy-21-fluoro-4,9(11)-pregnadiene-3,20-dione.

0.5 gram of 6α-methyl-17α-hydroxy-21-fluoro-4,9(11)-pregnadiene-3,20-dione was dissolved in twenty milliliters of methylene chloride and thereto was added a solution of one milliliter of 71 percent perchloric acid in ten milliliters of water and 200 milligrams of N-bromoacetamide in fifty milliliters of tertiary butyl alcohol. The solution was maintained at room temperature for fifteen minutes and then mixed with a solution of 0.3 gram of sodium sulfite in twelve milliliters of water. The mixture was distilled at reduced pressure until the residual solution became cloudy. The product was then precipitated by the addition of 100 milliliters of a mixture of ice-water. The white crystalline precipitate was filtered, washed with water and then dried and recrystallized from a mixture of acetone and Skellysolve B hexane hydrocarbons to give 6α-methyl-9α-bromo-11β,17α-dihydroxy-21-fluoro-4-pregnene-3,20-dione.

A mixture of 0.45 gram of 6α-methyl-9α-bromo-11β,17α-dihydroxy-21-fluoro-4-pregnene-3,20-dione, 0.45 gram of anhydrous potassium acetate and twenty milliliters of acetone was heated at its refluxing temperature for a period of five hours. The mixture was then cooled and poured into water and extracted with methylene chloride. The methylene chloride extract was dried and poured over a column of 25 grams of Florisil synthetic magnesium silicate. The column was developed with Skellysolve B hexane hydrocarbons containing increasing portions of acetone. The Skellysolve B plus ten percent acetone eluate contained 6α-methyl-9(11)-oxido-17α-hydroxy-21-fluoro-4-pregnene-3,20-dione.

A solution of one gram of 6α-methyl-9(11)-oxido-17α-hydroxy-21-fluoro-4-pregnene-3,20-dione was dissolved in fifty milliliters of methylene chloride and thereto was added five milliliters of 48 percent hydrofluoric acid and 0.5 milliliter of 71 percent perchloric acid. The mixture was stirred vigorously for six hours and then poured into an excess of cold aqueous five percent sodium bicarbonate solution. The methylene chloride layer was separated, dried with anhydrous sodium sulfate and then poured over a column of 100 grams of Florisil synthetic magnesium silicate. The column was developed with Skellysolve B hexanes and acetone, the fractions containing ten percent acetone were recrystallized from acetone and Skellysolve B hexanes to give pure 6α-methyl-9α,21-difluoro-11β,17α-dihydroxy-4-pregnene-3,20-dione.

Following the procedure described in Example 11, but substituting other 6α-alkyl- or 6α-aryl-11β,17α-dihydroxy-21-fluoro-4-pregnene-3,20-diones for the 6α-methyl-11β,17α-dihydroxy-21-fluoro-4-pregnene-3,20-dione wherein the alkyl or, respectively, aryl radical is ethyl, propyl, isopropyl, butyl, isobutyl, pentyl, hexyl, phenyl, or the like, results in the corresponding 6α-alkyl-9α,21-difluoro-11β,17α-dihydroxy-4-pregnene-3,20-dione wherein the alkyl group will be ethyl, propyl, isopropyl, butyl, isobutyl, pentyl, hexyl, or aryl, such as phenyl, or the like.

Example 12

6α-methyl-9α,21-difluoro-17α-hydroxy-4-pregnene-3,11,20-trione

Oxidizing in the manner given in Example 8, 6α-methyl-9α,21-difluoro-11β,17α-dihydroxy-4-pregnene-3,20-dione with N-bromoacetamide in pyridine solution produces 6α-methyl-9α,21-difluoro-17α-hydroxy-4-pregnene-3,11,20-trione.

In the manner similar to Example 12, oxidizing with N-bromoacetamide in pyridine solution or with chromic anhydride in acetic acid solution, other 6α-alkyl- or 6α-aryl-9α,21-difluoro-11β,17α-dihydroxy-4-pregnene-3,20-dione results in the corresponding 6α-alkyl-9α,21-difluoro-17α-hydroxy-4-pregnene-3,11,20-triones wherein the alkyl group is ethyl, propyl, isopropyl, butyl, isobutyl, pentyl, hexyl, or aryl, such as phenyl, or the like. In the same manner as shown with the 6α-epimer, the 6β-epimer may be used as starting material for Examples 11 and 12.

This application is a continuation-in-part of copending application S. N. 608,663, now abandoned, filed September 10, 1956.

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:
1. A compound selected from the group consisting of 6 - methyl - 11β,17α - dihydroxy - 21 - fluoro - 4 - pregnene-3,20-dione and 6-methyl-17α-hydroxy-21-fluoro-4-pregnene-3,11,20-trione.
2. 6 - methyl - 11β,17α - dihydroxy - 21 - fluoro - 4 - pregnene-3,20-dione.
3. 6α - methyl - 11β,17α - dihydroxy - 21 - fluoro - 4 - pregnene-3,20-dione.
4. 6 - methyl - 17α - hydroxy - 21 - fluoro - 4 - pregnene-3,11,20-trione.
5. 6α - methyl - 17α - hydroxy - 21 - fluoro - 4 - pregnene-3,11,20-trione.

References Cited in the file of this patent

UNITED STATES PATENTS

| | | |
|---|---|---|
| 2,684,968 | Bergstrom | July 27, 1954 |
| 2,686,188 | Johnson | Aug. 10, 1954 |
| 2,752,369 | Holyzz et al. | June 26, 1956 |
| 2,768,191 | Warnant | Oct. 23, 1956 |
| 2,786,857 | Cutler | Mar. 26, 1957 |

OTHER REFERENCES

Tannhauser et al.: J. A. C. S., 18, pages 2658–9, June 5, 1956.

Spero et al.: J. A. C. S., 78, pages 6213–14 (1956).